US011254336B2

(12) United States Patent
Underwood et al.

(10) Patent No.: US 11,254,336 B2
(45) Date of Patent: Feb. 22, 2022

(54) RAIL FLAW DETECTOR

(71) Applicant: NORDCO INC., Oak Creek, WI (US)

(72) Inventors: Paul Sanders Underwood, Bridgewater, CT (US); David William Giragosian, Waterbury, CT (US); Ian Wallace McGrath Gage, Stratford, CT (US); Phillip Edwards, II, Bridgeport, CT (US); John E. Leonard, Middlefield, CT (US); Jacob Eisler, Wellington, FL (US); Ronald M. Keenan, Oxford, CT (US); Joseph Setaro, Danbury, CT (US)

(73) Assignee: NORDCO INC., Oak Creek, WI (US)

( * ) Notice: Subject to any disclaimer, the term of this patent is extended or adjusted under 35 U.S.C. 154(b) by 168 days.

(21) Appl. No.: 16/719,672

(22) Filed: Dec. 18, 2019

(65) Prior Publication Data
US 2020/0198672 A1    Jun. 25, 2020

Related U.S. Application Data

(60) Provisional application No. 62/782,165, filed on Dec. 19, 2018.

(51) Int. Cl.
*G01N 29/07* (2006.01)
*G01N 29/265* (2006.01)
(Continued)

(52) U.S. Cl.
CPC ............ *B61K 9/08* (2013.01); *B61L 23/042* (2013.01); *G01N 29/07* (2013.01); *G01N 29/221* (2013.01);
(Continued)

(58) Field of Classification Search
CPC .... B61L 23/044; B61L 23/042; B61L 15/009; G01N 29/07; G01N 29/11; G01N 29/221;
(Continued)

(56) References Cited

U.S. PATENT DOCUMENTS 5,777,891 A * 7/1998 Pagano ............. G01N 29/0609
702/39
6,324,912 B1   12/2001 Wooh
(Continued)

FOREIGN PATENT DOCUMENTS

GB          2533140     *  6/2016 ............... G05D 1/00

*Primary Examiner* — Jacques M Saint Surin
(74) *Attorney, Agent, or Firm* — Greer, Burns & Crain, Ltd.

(57) ABSTRACT

A rail flaw detector is configured for locating flaws in rails of a railroad track and for use with a vehicle travelling on the railroad track. The detector includes at least one signal applicator configured for applying ultrasonic signals to the rail and for receiving return signals; a mechanical subsystem connected to the applicator and to the vehicle and configured for maintaining the at least one signal applicator in operational position on the track. A human-machine interface is connected to the at least one signal applicator, is configured to control the detector and to monitor sensed rail condition. In one embodiment, the human-machine interface includes a schematic display of the rail being monitored and at least one touch screen control for controlling the mechanical subsystem and the at least one signal applicator.

7 Claims, 8 Drawing Sheets

(51) Int. Cl.
    *B61L 23/04*    (2006.01)
    *G01N 29/22*    (2006.01)
    *B61K 9/08*     (2006.01)

(52) U.S. Cl.
    CPC ... *G01N 29/265* (2013.01); *G01N 2291/2623* (2013.01)

(58) Field of Classification Search
    CPC ..... G01N 2291/044; G01N 2291/2623; B61K 9/10
    USPC .......................................................... 73/636
    See application file for complete search history.

(56) References Cited

U.S. PATENT DOCUMENTS

| | | | |
|---|---|---|---|
| 6,715,354 B2 | 4/2004 | Wooh | |
| 6,728,515 B1 | 4/2004 | Wooh | |
| 6,833,554 B2 | 12/2004 | Wooh | |
| 6,862,936 B2 | 3/2005 | Kenderian et al. | |
| 6,945,114 B2 | 9/2005 | Kenderian et al. | |
| 6,981,419 B1 | 1/2006 | Hay et al. | |
| 7,082,833 B2 | 8/2006 | Heyman et al. | |
| 7,144,057 B1 * | 12/2006 | Young | H05K 7/1462 296/24.3 |
| 7,213,459 B2 | 5/2007 | Sengupta | |
| 7,278,315 B1 | 10/2007 | Klein et al. | |
| 7,389,694 B1 * | 6/2008 | Hay | G01N 29/2412 73/600 |
| 7,516,662 B2 | 4/2009 | Nielsen et al. | |
| 7,520,172 B2 | 4/2009 | Gifford et al. | |
| 7,555,954 B2 | 7/2009 | Pagano et al. | |
| 7,743,660 B2 | 6/2010 | Marsh et al. | |
| 7,849,748 B2 * | 12/2010 | Havira | G01N 29/2493 73/639 |
| 7,938,008 B2 | 5/2011 | Owens et al. | |
| 9,562,878 B2 | 2/2017 | Graham et al. | |
| 9,981,671 B2 | 5/2018 | Fraser et al. | |
| 2006/0201253 A1 | 9/2006 | Gonzales et al. | |
| 2012/0279308 A1 | 11/2012 | Yan et al. | |

* cited by examiner

RAIL FLAW DETECTOR

RELATED APPLICATION

This application is a Non-Provisional of, and claims 35 USC 119 priority from, U.S. Ser. No. 62/782,165 filed Dec. 19, 2018, the contents of which are incorporated by reference herein.

BACKGROUND

This invention relates generally to railway right of way maintenance equipment, and more specifically, to apparatus for monitoring railway tracks for defects.

Rail breaks are the single most common cause of train derailments (Liu et al, 2018). On average, each derailment causes approximately $531,000 in equipment and track damage (Liu et al, 2018).

Ultrasonic inspection is used for conventional rail flaw inspection. Current systems are designed and operated to detect a variety of internal rail flaws. Different ultrasonic beam angles and focal points are applied simultaneously to detect flaws in the rail head, web, and base. Often a dedicated truck or inspection car is used. This inspection method provides valuable data, but they are not easy to use.

Conventional systems require a specially trained, dedicated operator called a Chief Operator. Another operator is required to drive the test vehicle. The Chief Operator observes and analyzes the ultrasonic data, and determines if the data indicates a flaw. The Chief Operator also determines the type of each indicated defect based on signal details. Alignment to the rail is critical, requiring extensive operator expertise to set up and maintain alignment as the vehicle travels. Lateral and cant adjustments are needed to account for track variations. Before starting the test, the Chief Operator sets amplifier gain and signal gates for each transducer. The Chief Operators call on years of experience to interpret the user interface, which displays real time signal data. Operator attention must stay focused on the screen to avoid missing possible defect signals.

Current ultrasonic rail test systems are expensive because they contain complicated electronic systems, multiple expensive ultrasonic transducers, and large mechanical systems needed to apply the signal to the rail and maintain alignment. Several channels of electronics are needed. Each transducer requires its own power supply and pulser to create separate high energy pulses and to process received pulses.

High equipment purchase and operating costs, and the need for specialized labor, limit the amount of testing that can be performed using traditional ultrasonic rail testing apparatus. Class 1 railroads inspect each section of track once every 140 days, and every 30 days for heavy traffic areas. The systems are designed to identify a wide range of flaws. Because of the long duration between tests, early detection is key. The goal is to identify small flaws before they grow and cause rail breaks. Even with today's advanced equipment and highly trained personnel, small flaws can be very difficult to find. A single small flaw can grow into a big problem like a broken rail before the next inspection. This results in service failures such as derailments.

Thus, there is a need for an improved rail flaw detection apparatus that addresses the above-listed drawbacks.

SUMMARY

The present rail flaw detector addresses the above-identified need, and reduces train derailments through relatively frequent rail head ultrasonic inspection, improving detection of existing and impending rail head breaks. The operator interface is very simple and no ultrasonic training or knowledge is required. Also, the present system is designed for use by existing "roadmasters" so no additional railroad personnel are needed and the equipment costs far less than existing ultrasonic inspection systems. An additional advantage is that the present system is compact and installs easily on a standard roadmaster vehicle, which is typically a medium-duty truck equipped with by-rail gear for on-track operation. In a preferred embodiment, the present system easily mounts into a standard trailer hitch socket found on most rail test vehicles. Low equipment and training investment allows every roadmaster to use the present system every mile they drive on the rail. The operator need not monitor the results in real time. This means that a designated section of track can be inspected every one to seven days.

The present rail flaw detector complements existing rail flaw ultrasonic inspection. A known rail flaw detector is disclosed in commonly-assigned U.S. Pat. No. 9,562,878 which is incorporated by reference. Frequent inspection provides more chances to identify a potential issue before it results in a service failure. The present system detects broken rail heads and identifies some potential breaks before they occur. Legacy ultrasonic testing is still valuable for early detection of many potential rail flaws, including vertical and horizontal split heads, web-foot cracks, split web, bolt hole cracks, and piped rail.

Preferably, the present rail flaw detector employs wave direction and intended travel constrained in the rail head. This signal is designed to travel under shelling and tolerate vertical split heads. Signal processing (amplitude, time, relative location, persistence, more) is used to filter expected signals and noise. The system optionally refers to a knowledge base to filter out known track structures or other expected features. Additionally, the present rail flaw detector features a relatively simple electronic design because only a small number of channels are required.

A simple, relatively compact mechanical system mounts to the back of commonly used roadmaster track vehicles. The mechanical system locates the ultrasonic probe(s) on the rail(s), and maintains the required alignment position. The present rail flaw detector new system is tolerant to alignment changes, so a simpler alignment mechanism can be used. A user interface device mounts in the truck cab so the driver can see and hear it. The apparatus is designed so it can be easily shipped and installed. It may be incorporated into standard by-rail devices, rolling stock, or self-propelled rolling stock, eliminating the need for additional specialized delivery equipment to detect rail breaks.

In the present rail flaw detector, the operator is presented with a simple go/no go user interface, located within view of the driver seat. No driver interaction is required until a full or partial rail break is detected. The operator does not need to monitor the user interface while scanning, so he or she can continue to perform their other regular duties. No detailed ultrasonic signal data is provided or needed. A simple visual indicator and warning sounds are used to indicate an area of concern. The driver then stops and exits the vehicle to inspect or mark the defect location. Distance from the defect is preferably displayed and updated as the roadmaster vehicle moves toward or away from the defect. Data about indicated defects is preferably saved locally or remotely over a wireless network, providing historical information and the opportunity for further expert analysis.

Included in the present rail flaw detector are apparatus and methodology to detect a broken rail, whether the break is visible or not. It is contemplated that the apparatus is installed on by-rail, rolling stock, self-propelled rolling stock, or other mechanism to deliver the sensor to the rail under test. The present apparatus traverses the rail, or vice versa, in that rail segments are removed and tested remotely, and determines the point of failure to be displayed to an operator or monitoring system in real time and/or stored for evaluation off line. In the present embodiment, ultrasonic energy induces a guided wave in the rail. The guided wave energy is preferably received by a detecting sensor—either the sensor originating the energy wave or a separate receiving sensor for the energy wave. In the preferred embodiment, the originating sensor is used. An electronic system processes the received energy and uses software algorithms to determine if the energy signature indicates a broken rail. A simple user interface displayed on a mid-size screen notifies the user when a rail break is detected.

The present rail flaw detector includes four main subsystems: a human-machine interface, an electronic subsystem, a signal application subsystem, and a mechanical subsystem. All the subsystems are closely connected and interact with each other.

The human-machine interface (HMI) enables the user to control the system and monitor results. In the preferred embodiment, a touch screen tablet computer mounts within easy reach and view of the operator station. The computer displays a very simple user interface. Included on the display is an animated railroad track, left and right status indicators, a menu access button, and some simple control button graphics. The tablet is powered with 12 VDC provided by the vehicle, and communicates to the test system via CAT5 cable. A GPS receiver is provided to the tablet for tracking location and 4G LTE wireless communications. Software running on the tablet controls the display and processes user input. The software also includes a recognition engine which interprets received signals and identifies rail breaks. Break indications are shown on the tablet display and the tablet speaker emits an audible break alert signal. It is also contemplated that the HMI is a unit with only warning lights instead of a display with buttons. The user interface and the entire system are designed for use by people with limited training and no ultrasonic testing experience.

The electronic subsystem handles a variety of tasks. A power supply converts 12 VDC vehicle power to 24 DC used by the system. An Ethernet switch relays communication between system components and powers the main processor and pulsers via power over Ethernet (POE). A processor section uses an ARM microprocessor and a field programmable gate array to control the outgoing ultrasonic signal, process communications, interpret and filter received signals, and manage input/output duties. A pulser section creates the energy pulses that create the guided wave in the rail. An internal power supply section provides various voltages and currents needed for other sections. Input sections receive ultrasonic signals and monitor system status and HMI input. Output sections transmit ultrasonic signals and provide control signals to the motion control and couplant items.

The signal application system applies ultrasonic signals to the rail and receives return signals. A rolling search unit (RSU) is provided to the present rail flaw detector, and includes a polyurethane membrane, ultrasonic transducers, transducer mounting yoke, roller bearings, seals, and a central shaft assembly. An integrated encoder tracks movement by sending a signal as the RSU rotates. The RSU shaft and mating mount are designed to automatically align the transducers relative to the rail. Spring steel retaining plates provide rapid RSU removal and replacement without using tools. Two transducers are used: one pointing forward and one pointing backward as the RSU travels along the rail. Each transducer acts as both transmitter and receiver. Pulse signals from the electronic subsystem travel via twisted pair wire to the transducers. The RSU is filled with fluid which carries the ultrasonic signal and passes it to the membrane, minimizing reflection at the transducer and membrane interfaces. The RSU attaches to legs which are attached to the mechanical subsystem.

The mechanical subsystem provides facilitated mounting, motion control and alignment. The mechanical subsystem includes a main body that inserts into a standard towing hitch receiver or socket. Coarse and fine height adjustments adapt to any hitch receiver height. Alternatively, a custom mount is optionally provided to attach to the by-rail vehicle's underbody or frame. The RSU mounting legs rotate into position manually using a bar or wrench. An optional powered mechanism provides the rotation. Springs provide preselected down force to the RSU, and provide vertical compliance. A gas shock provides damping. An additional gas shock and slide mechanism provide lateral compliance and alignment of each RSU mounting leg relative to the rail.

The mechanical subsystem includes water valves which spray couplant onto the test area, improving transmission of the ultrasonic signal to the rail. A couplant tank, pump, and piping provide water to the valves. The couplant is pressurized at all times when the detection system is running. The RSUs and RSU mounts attach to a center frame via slide shafts. The mechanical system breaks down into self-contained subassemblies for easy installation and service. The broken rail detector system works by applying ultrasonic signals to the rail as the RSU rolls along the track. The system sends a signal on a specified interval, the distance or time between pulses is configurable. A guided wave forms, with the rail acting as a waveguide, and travels long distances in the rail. The signal reflects when it encounters a defect such as a rail break, travels back along the rail to the RSU, and a portion of the signal travels into the RSU and reaches a detector module. The detector module converts this ultrasonic signal to an electrical signal.

The electrical signal travels to the electronic subsystem. That system filters and processes the signal. Signals matching specific patterns and amplitudes get transmitted to the HMI where further processing and evaluation may occur. Detection algorithms determine if a rail break is present. The system alerts the user to each identified rail break on the HMI screen and by an audible tone. Based on the time of flight and known material properties, the system calculates distance to the defect. Direction to the defect is determined based on the detector module that received the defect signal. Indications update in real time as the apparatus moves along the rail. The system optionally identifies the break location and stores this information for future retrieval and analysis.

The system software architecture combines multiple self-hosting services. Software plugins allow the system to easily integrate with electronic hardware changes and different break and discontinuity algorithms.

The system is designed to be utilized by the Railroad roadmasters, Managers of Track Maintenance, and Track inspectors. In this application, the broken rail detection system will allow for near daily inspection of the rail structure looking specifically for failure points that require immediate remediation. The product is designed to be low cost, and for installation on current railroad equipment that is utilized in the railroads' daily maintenance and monitoring operations. This system is intended for passive use—the operator does not need to monitor the results in real time. The operator only needs to act when a broken rail is identified.

A Smart Transducer system stores information about the ultrasonic transducers and other key equipment. Stored information includes part number, serial number, manufacturer, and manufacturing date code. It is also contemplated that assembly serial number, customer name, sale date, sales order/purchase order number, additional inventory/manufacturing/customer data, transducer characteristics (frequency, size, intended orientation, etc.), certification results, historical and lifecycle information (number of pulses, hours in operation, temperature history, shock or vibration history), predicted service date, compatible equipment, end user license status are stored as well in the transducer system.

The present rail flaw detection system powers up whenever the host vehicle is in use. Configuration and troubleshooting is provided via any local wired connection for on-site support or wireless connection for remote support. Authorized service technicians have USB storage devices equipped with specific troubleshooting and configuration software.

More specifically, a rail flaw detector is configured for locating flaws in rails of a railroad track and for use with a vehicle travelling on the railroad track. The detector includes at least one signal applicator configured for applying ultrasonic signals to the rail and for receiving return signals; a mechanical subsystem connected to the applicator and to the vehicle and configured for maintaining the at least one signal applicator in operational position on the track. A human-machine interface is connected to the at least one signal applicator, configured to control the detector and to monitor sensed rail condition. In one embodiment, the human-machine interface includes a schematic display of the rail being monitored and at least one touch screen control for controlling the mechanical subsystem and the at least one signal applicator.

In an embodiment, the signal applicator includes a rolling search unit including at least one ultrasonic transducer mounted in operational relation to the rail, an integrated encoder connected to the applicator and monitoring travel along the rail. In an embodiment, the at least one transducer is two transducers, one mounted forward and one mounted rearward relative to the direction of travel of the detector along the track, each transducer being a transmitter and receiver of ultrasonic signals. In an embodiment, each transducer is constructed and arranged for generating a guided wave in the rail as the rolling search unit travels along the rail, the rail acting as a waveguide, and the emitted guided wave reflects back to the rolling search unit upon encountering a rail defect, and reaches a detector in the rolling search unit, which converts the wave into an electrical signal.

DETAILED DESCRIPTION

Figure 1:
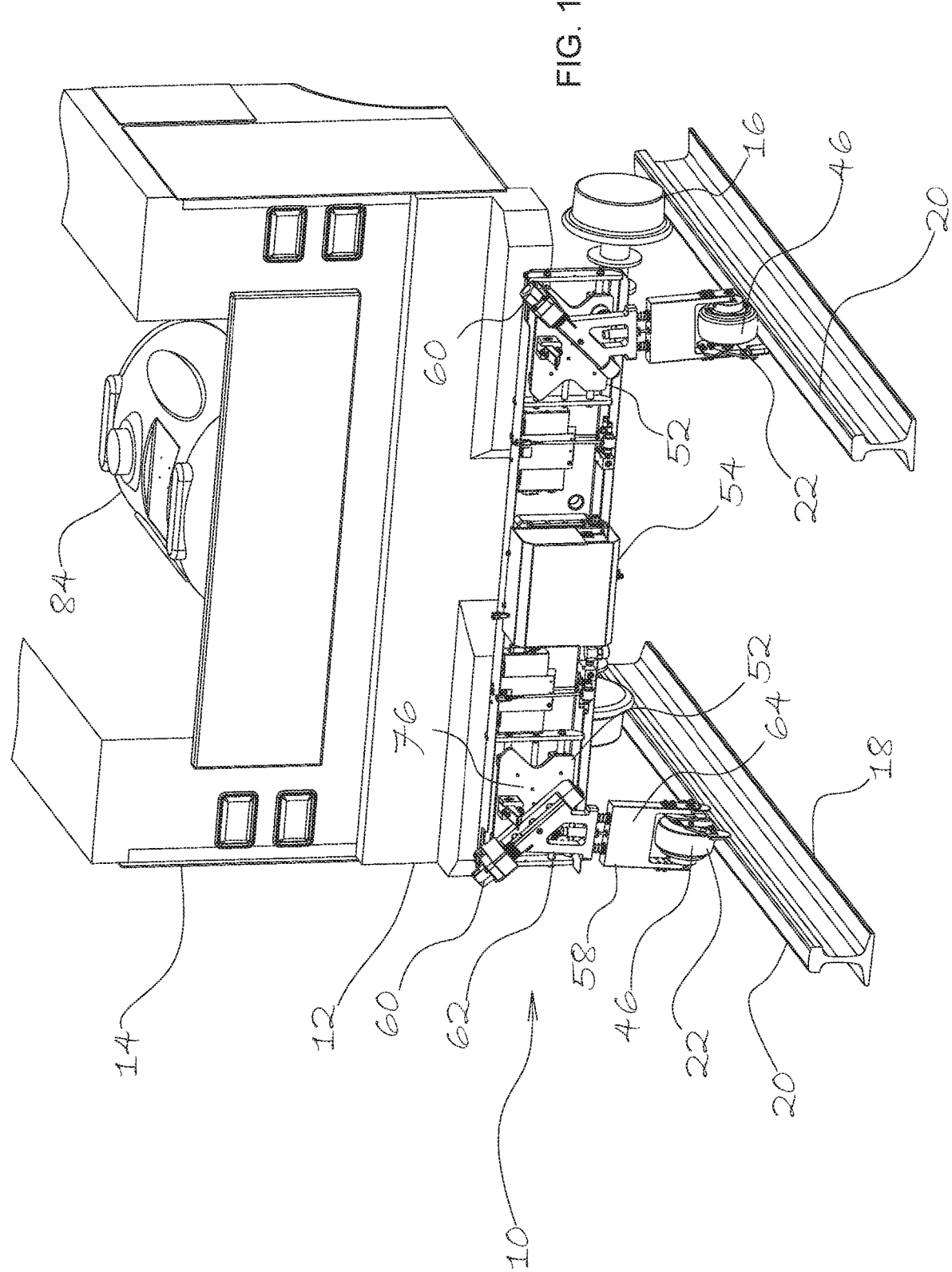
FIG. 1 is a view of a by-rail railway maintenance vehicle equipped with the present rail flaw detector.
Figure 3:
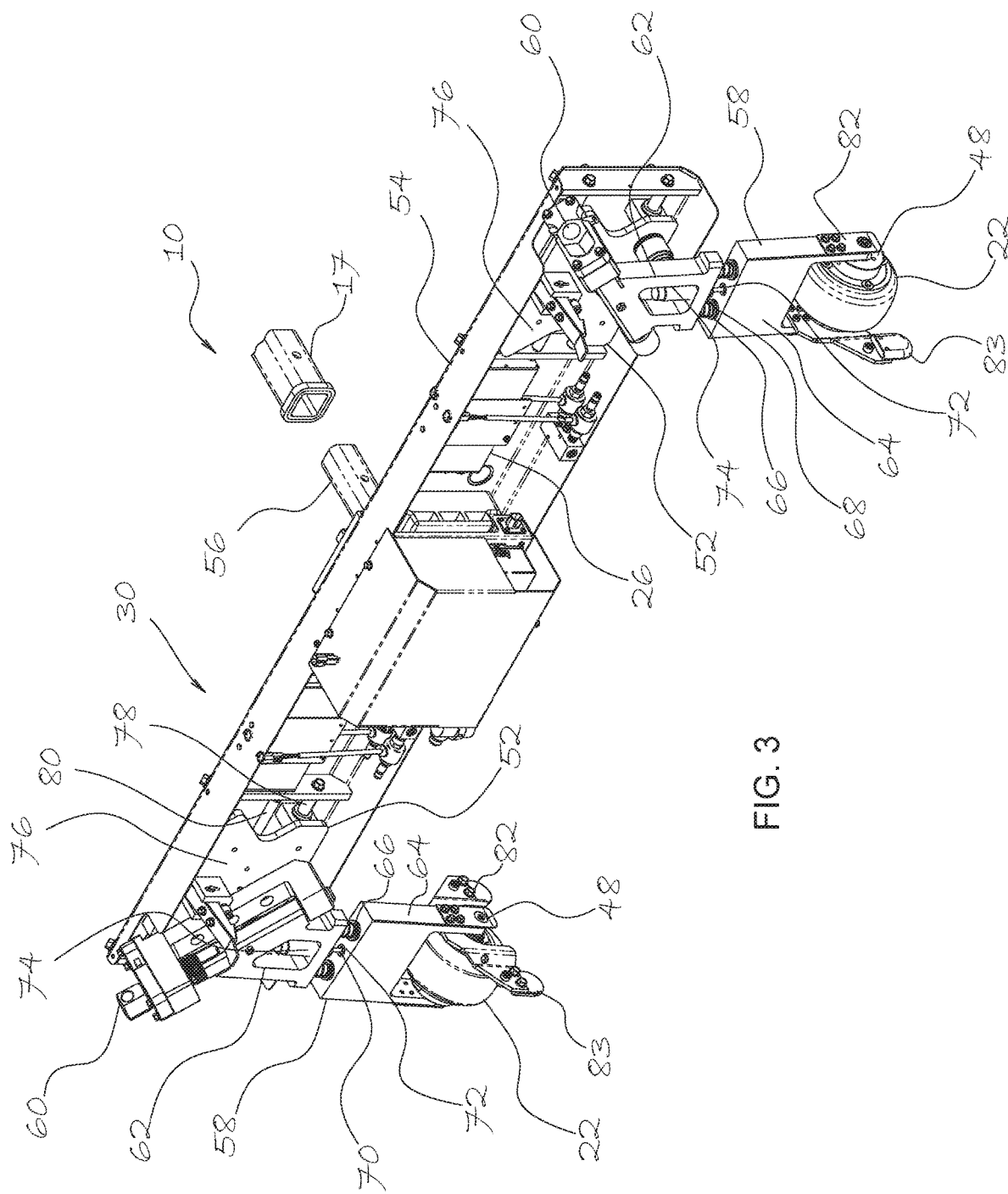
FIG. 3 is a top perspective view of the present rail flaw detector.
Figure 4:
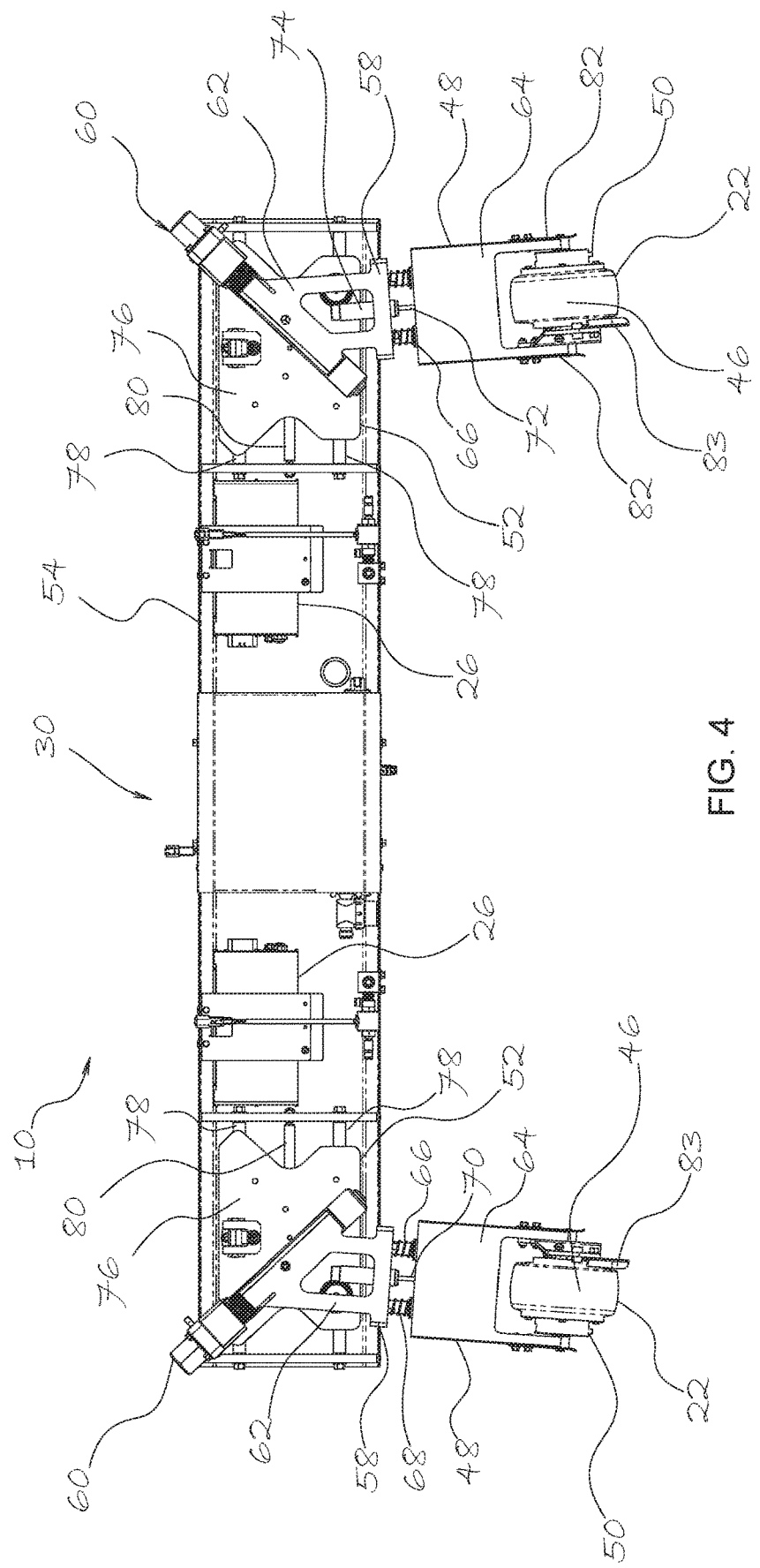
FIG. 4 is a front view of the present rail flaw detector.
Figure 5:
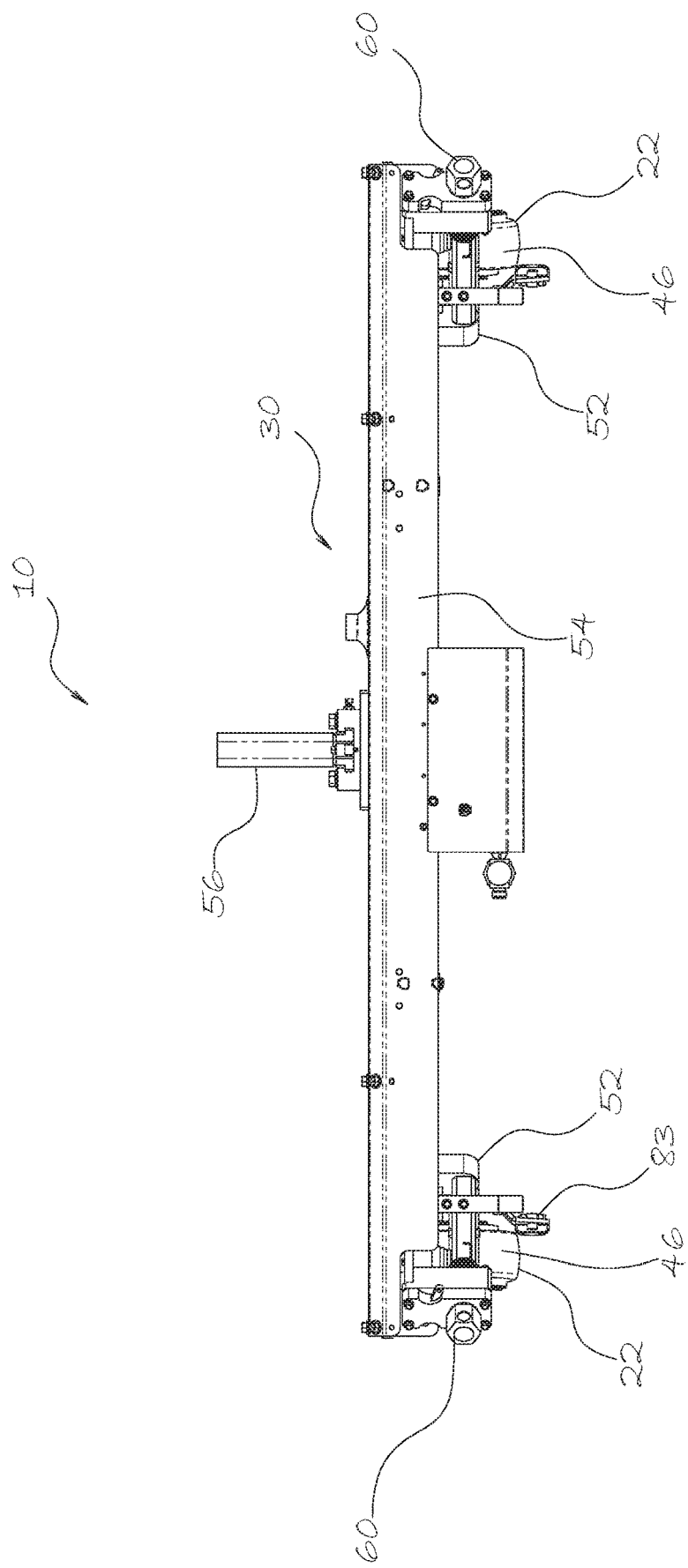
FIG. 5 is a top view of the present rail flaw detector.
Figure 6:
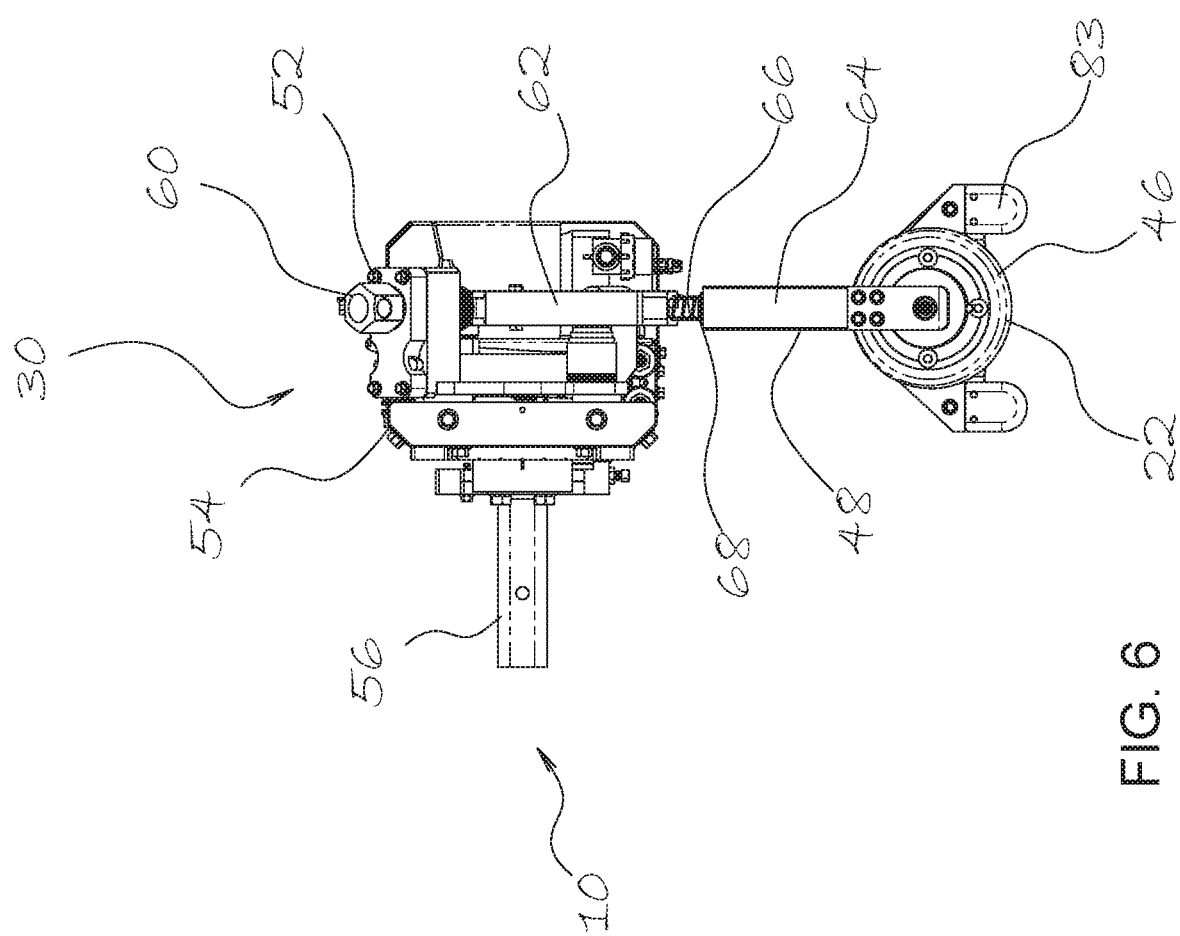
FIG. 6 is an end view of the present rail flaw detector.

Referring now to FIG. 1, the present rail flaw detector, also referred to as the present system, is generally designated 10 and is shown mounted to a conventional by-rail vehicle 12, referring to a conventional truck 14 equipped with retractable rail wheels 16 and a trailer hitch 17 (FIG. 3). It is contemplated that the present rail flaw detector 10 is optionally mounted on any rail rolling stock, whether or not self-propelled, or any vehicle movable on railroad track 18, including a pair of parallel rails 20 as is well known in the art. As seen in FIG. 1, the rail flaw detector 10 includes a rolling search unit (RSU) 22 described in greater detail below.

Figure 2:
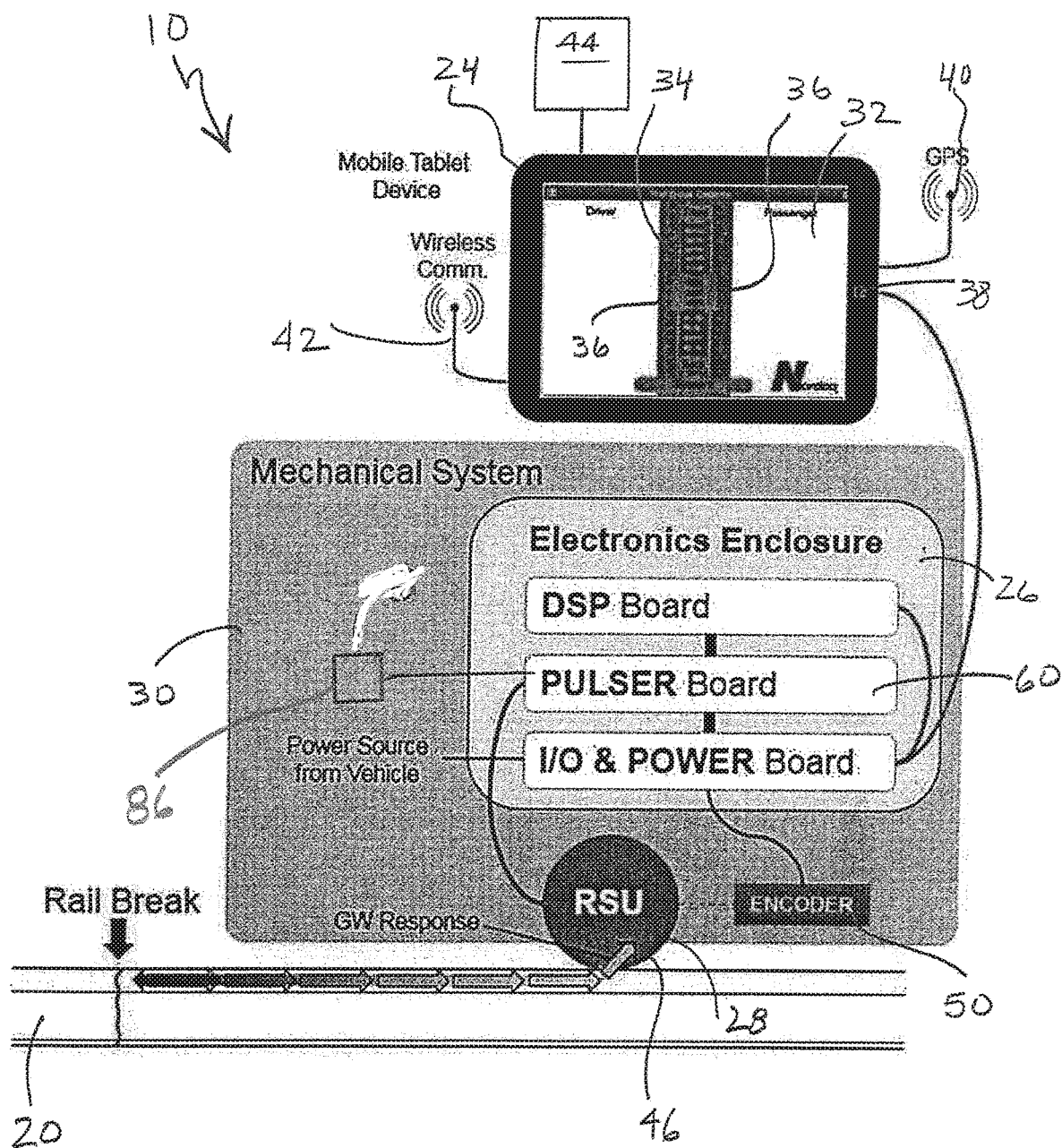
FIG. 2 is a schematic view of the present rail flaw detector.
Figure 7:
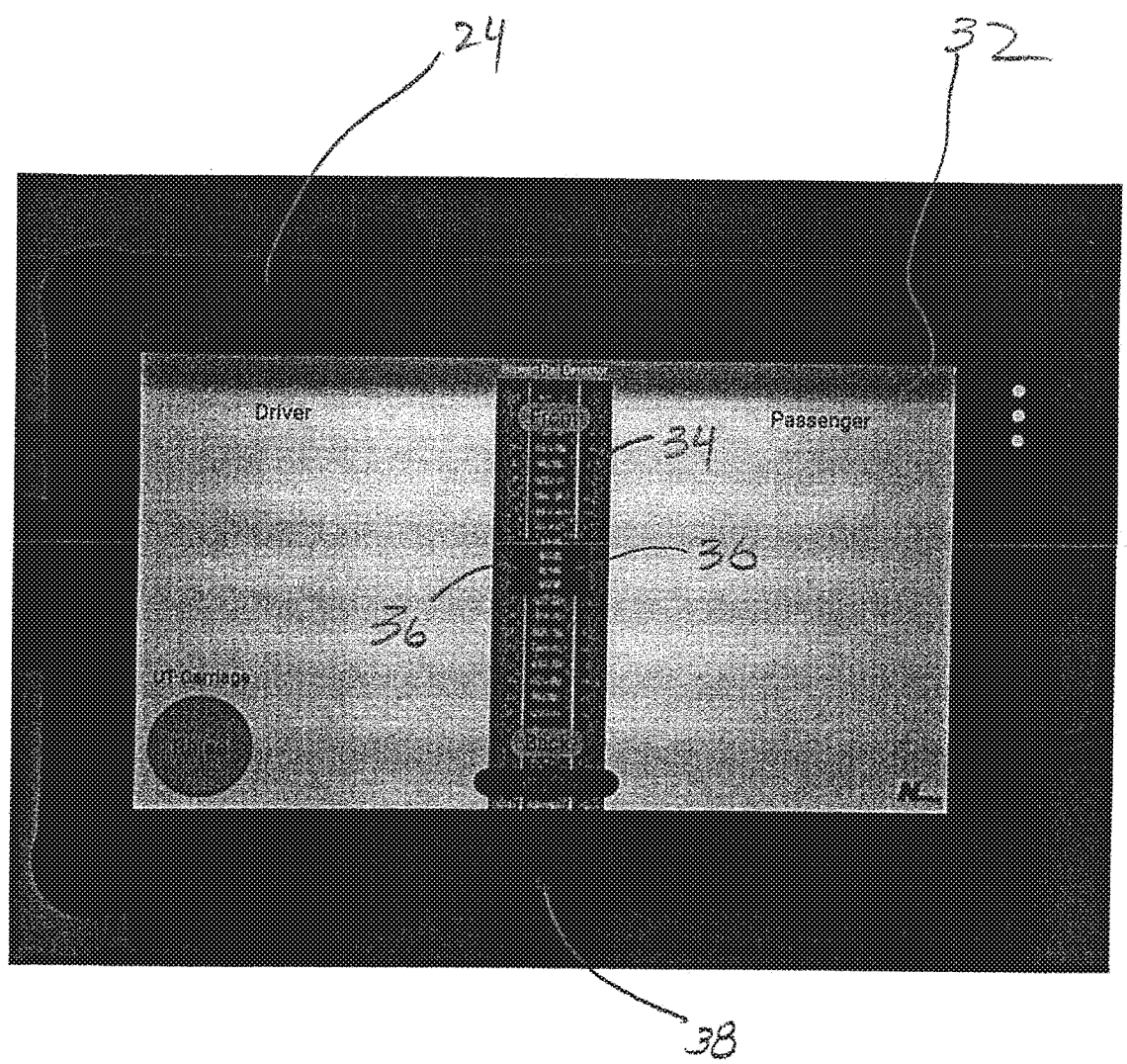
FIG. 7 is a sample display image from the human machine interface (HMI)
Figure 8:
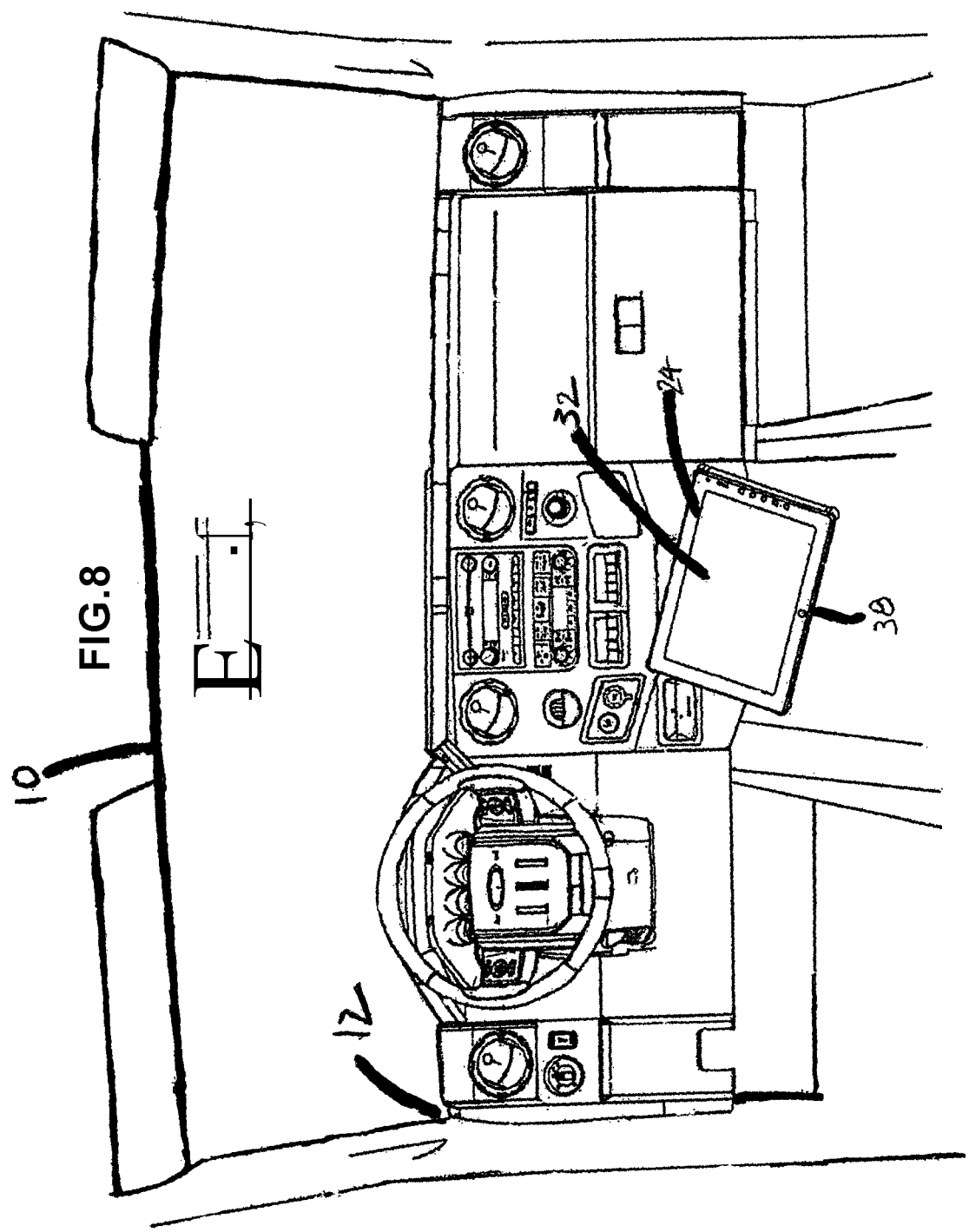
FIG. 8 is a fragmentary cockpit view of the by-rail vehicle of FIG. 1 showing the present rail flaw detector display.

Referring now to FIGS. 2, 7 and 8, the present rail flaw detector 10 includes four main subsystems, all of which are interconnected and interactive: 1) a human-machine interface 24; 2) an electronic subsystem 26; 3) a signal application system 28; and 4) a mechanical subsystem 30.

The human-machine interface (HMI) 24 is preferably embodied in a touch screen display 32, of the type conventionally found on a tablet computer, mobile phone display or the like. Other human interactive display technologies are contemplated, including the use of buttons or keyboards connected to a conventional display screen, as is known in the art. Another option is an HMI having only red and green warning lights and no display screen, in which case rail defect recognition is performed in the electronic subsystem 26 on a processor board. Included on the display 32 is a schematic of a railroad track 34, as well as rail status indicators 36. A menu access button 38 is connected to other subsystems and enables the operator to control the system 10.

In the preferred embodiment, the HMI 24 is powered from the onboard 12 Volt DC power system on the vehicle 12, and further includes a GPS receiver 40 for tracking location, and is configured for wireless communication at 42, preferably 4G LTE or similar format in conventional use. Connection between the HMI 24, and the signal application system 28 and the mechanical subsystem 30 is preferably by cable such as CAT5 cable or the like, or is optionally wireless.

A software program 44 running on the display 32 controls the display and processes user input, as well as having a recognition engine that interprets received signals and identifies rail breaks, which are indicated on the display. In the preferred embodiment, once a rail break is detected, the program 44 also generates an audible alarm. In general, the program 44 is designed to be "user friendly" and easily manipulated by operators lacking extensive training.

Referring again to FIG. 2, the electronic subsystem 26 includes a power supply converter to convert the 12 VDC vehicle power to 24 VDC used by the system 10. An Ethernet switch relays communication between system components and powers the main processor and pulsers via power over Ethernet (POE). A processor section uses an ARM microprocessor and a field programmable gate array to control the outgoing ultrasonic signal, process communications, interpret and filter received signals, and manage input/output duties. A pulser section creates the energy pulses that create the guided wave in the rail. An internal power supply section provides various voltages and currents needed for other sections. Input sections receive ultrasonic signals and monitor system status and HMI input. Output sections transmit ultrasonic signals and provide control signals to the motion control and couplant items.

The signal application system 28 applies ultrasonic signals to the rail 20 and receives return signals. In the preferred embodiment, the system 28 is connected to the RSU 22 (FIGS. 3-6). The RSU 22 includes a polyurethane membrane, wheel-mounted ultrasonic transducers 46, a transducer mounting yoke, roller bearings, seals, and a shaft assembly 48. An integrated encoder 50 (FIG. 2) tracks movement by sending a signal as the RSU rotates. The RSU shaft 48 assembly and laterally sliding mating mount 52 moving relative to a main RSU frame 54 connected to the by rail vehicle 12 are designed to automatically align the transducers 46 relative to the rail 20. Two transducers 46 are used: one pointing forward and one pointing backward as the RSU 22 travels along the rail 20. Each transducer 46 acts as both transmitter and receiver. Pulse signals from the electronic subsystem 26 travel via twisted pair wire to the transducers 46. The RSU 22 is filled with fluid which carries the ultrasonic signal and passes it to the membrane, minimizing reflection at the transducer and membrane interfaces.

Referring now to FIGS. 3-6, the mechanical subsystem 30 provides motion control and alignment. The main frame or main body 54 inserts into the standard towing hitch receiver 17 using a conventional hitch stem 56. Coarse and fine height adjustments adapt to any hitch receiver height. Alternatively, a custom mount can be used to attach to the underbody or frame of the by-rail vehicle 12. Included on the RSU 22 are mounting legs 58 that rotate into position relative to the main frame 54 manually by the user employing a bar or wrench. Adjustment of the pivoting position of the mounting leg 58 is preferably achieved by accessing a fastener 60 such as a bolt. In the preferred embodiment the fastener 60 is inclined relative to the main frame 54 at an approximate 45-degree angle, however other angular orientations are contemplated. Optionally, a powered mechanism is contemplated for achieving rotation of the mounting legs 58.

More specifically, each mounting leg 58 includes an upper portion 62 connected to the fastener 60, and a lower portion 64 vertically movable relative to the upper portion and bearing the transducer wheel 46. A suspension 66 connects the upper portion 62 to the lower portion 64 to accommodate irregularities in the rails 20. In the preferred embodiment, the suspension 66 includes a pair of coil springs 68 biasing the lower portion 64 towards the rail 20, and located on either side of a gas or pneumatic spring 70 provided for dampening vertically directed shocks received by the lower portion.

It is preferred that the gas spring or shock 70 includes a shaft 72 extending from a cylinder 74 located on the upper portion 62. The shaft contacts the lower portion 64. The suspension 66 provides correct down force to the RSU 22, and provide vertical compliance. In the present application, "springs" refers to mechanical, pneumatic, or gas biasing devices well known in the art.

In addition, a gas shock and slide mechanism 76 provide lateral compliance and alignment of each RSU mounting leg relative to the main frame 54 and to the rail 20. A preferably horizontal shaft 78 mounts the mechanism 76 to the main frame 54. The gas shock 80 is part of the mechanism 76 and moves laterally relative to the shaft 78. Also, the upper portion 62 of the mounting leg 58 is connected to the mechanism 76 for lateral movement relative to the main frame 54.

Another feature of the present system 10 and the mechanical subsystem 30 is that rolling search unit 22, and specifically the wheel 46 is releasably mounted and retained to the lower portion 64 of the mounting leg 58 by at least one quick release spring latch 82 for rapid removal and replacement of the transducer wheel 46 without using tools. In operation, the quick release spring latch 82 swings out away from the lower portion 64 under manipulation by the user. Optional alignment blades 83 are also secured to the lower portion 64 and engage the rail 20 near the transducer wheels 46.

Also included in the mechanical subsystem 30 are water valves which spray couplant onto the test area, enhancing transmission of the ultrasonic signal to the rail. A couplant tank 84 (FIG. 1), a pump, and piping (not shown) provide water to the valves. The couplant is pressurized at all times when the detection system 10 is running. The RSU transducers 46 are each connected to one of the slidable mounts 52, which is attached to the center or main frame 54 via the mounting shaft assembly 48. Variations in the construction of the main frame 54 are contemplated to adapt the system 10 to various carrying vehicles. It is also preferred that the mechanical system 30 breaks down into self-contained subassemblies for easy installation and service.

Referring again to FIG. 2, the system 10 preferably uses ultrasonic energy to induce a guided wave in the rail 20. The guided wave energy is received by a detecting sensor—either the transducer 46 originating the energy wave or a separate receiving sensor for the energy wave. The electronic subsystem 26 processes the received energy and includes software algorithms to determine if the energy signature indicates a broken rail. If so, the display 32 graphically indicates a break on the rail image 34, and an audible alarm is preferably generated.

The broken rail detector system 10 applies ultrasonic signals to the rail 20 as the RSU 22 travels along the track 18. In the preferred embodiment, the system 10 sends a signal on a specified interval, and the distance or time between pulses is configurable. A guided wave forms, with the rail 20 acting as a waveguide. The guided wave travels long distances in the rail 20, and the signal reflects when it encounters a defect such as a rail break. The reflected signal travels back along the rail 20 to the RSU 22, and a portion of the signal travels into the RSU and reaches a detector module. The detector module 58 converts this ultrasonic signal to an electrical signal.

Next, the electrical signal travels to the electronic subsystem 26. That system filters and processes the signal. Signals matching specific patterns and amplitudes are transmitted to the HMI 24, where further processing and evaluation occurs. Detection algorithms determine if a rail break is present. The system 10 alerts the user to each identified rail break on the HMI display 32 and by an audible tone. Based on the time of flight and known material properties, the system 10 calculates distance to the defect. Direction to the defect can be determined based on the detector module 58 that received the defect signal. Indications update in real time as the by-rail vehicle 12 moves along the rail 20. The system 10 preferably identifies the break location and stores this information for future retrieval and analysis.

It is preferred that the system software architecture combines multiple self-hosting services. Software plugins allow the system to easily integrate with electronic hardware changes and different break and discontinuity algorithms. Plugin technology supports Machine-Learning which will be added as the broken rail detection system becomes more mature.

The system 10 is designed to be utilized by the Railroad road masters, Managers of Track Maintenance, and Track inspectors. In this application, the present broken rail detection system 10 allows for near daily inspection of the rail structure looking specifically for failure points that require immediate remediation. The system 10 is designed to be low cost, and for installation on current railroad equipment that is utilized in the railroads' daily maintenance and monitoring operations. In addition, the system 10 is intended for passive use—the operator does not need to monitor the results in real time. The operator only needs to act when a broken rail is identified.

A Smart Transducer system stores information about the ultrasonic transducers and other key equipment. Stored information includes part number, serial number, manufacturer, and manufacturing date code. It is also contemplated that storage of information including, but not limited to: assembly serial number, customer name, sale date, sales order/purchase order number, additional inventory/manufacturing/customer data, transducer characteristics (frequency, size, intended orientation, etc.), certification results, historical and lifecycle information (number of pulses, hours in operation, temperature history, shock or vibration history), predicted service date, compatible equipment, end user license status. The inspection system includes software functions that compare rail break inspection data over time, to look for trends such as defect growth. Alerts or alarms are programmed in the software to notify the operator of a problem rail or a potential break that needs monitoring.

The system 10 powers up whenever the host vehicle 12 is in use. Sensors are used to provide semi-automatic operation and safety. Configuration and troubleshooting is provided via any local wired connection for on-site support or wireless connection for remote support. Authorized service technicians have USB storage devices equipped with specific troubleshooting and configuration software.

While a particular embodiment of the present rail flaw detector has been described herein, it will be appreciated by those skilled in the art that changes and modifications may be made thereto without departing from the invention in its broader aspects and as set forth in the following claims.

The invention claimed is:

1. A rail flaw detector configured for locating flaws in rails of a railroad track and for use with a vehicle travelling on the railroad track, said detector comprising:
    at least one signal applicator configured for applying ultrasonic signals to the rail and for receiving return signals, said at least one signal applicator includes a rolling search unit including a first ultrasonic transducer and a second ultrasonic transducer, said first ultrasonic transducer and said second ultrasonic transducer being mounted in operational relation to the rails, and an integrated encoder connected to the at least one signal applicator and configured for monitoring travel along the rails, wherein said first transducer is mounted forward and said second transducer is mounted rearward relative to the direction of travel of the detector along the track, each of said first and second transducers being a transmitter and receiver of ultrasonic signals,
    said first ultrasonic transducer and said second ultrasonic transducer each being constructed and arranged for generating a guided wave in at least one rail of the rails as said rolling search unit travels along the said at least one rail, the at least one rail acting as a waveguide, and the emitted guided wave reflects back to said rolling search unit upon encountering a rail defect, and reaches a detector in said rolling search unit, which converts the wave into an electrical signal;
    a mechanical subsystem connected to said applicator and to the vehicle and configured for maintaining said at least one signal applicator in operational position on the track; and
    a human-machine interface connected to said at least one signal applicator, being configured to control said detector and to monitor sensed rail condition.

2. The rail flaw detector of claim 1, wherein said mechanical subsystem includes a pressurized water couplant system for applying water to the rail to enhance transmission and reception of ultrasonic signals sourced by said at least one signal applicator.

3. The rail flaw detector of claim 1, wherein said mechanical subsystem includes at least one first spring for applying down pressure to the rail, and at least one second spring for aligning said at least one signal applicator relative to the rail.

4. The rail flaw detector of claim 1, wherein said human-machine interface includes a computer software program with a recognition engine configured for interpreting signals received from said at least one signal applicator and identifying rail flaws, which are displayed on a rail schematic display, and generating an audible alarm upon detection of a rail flaw.

5. The rail flaw detector of claim 4, wherein said human-machine interface includes a GPS receiver and 4G LTE wireless communications software.

6. The rail flaw detector of claim 1, wherein said human-machine interface includes a schematic display of the rail being monitored and at least one touch screen control for controlling said mechanical subsystem and said at least one signal applicator.

7. The rail flaw detector of claim 1, wherein said rolling search unit is mounted and retained by at least one quick release spring latch for rapid removal and replacement without using tools.

* * * * *